(12) United States Patent
Sala Llumà et al.

(10) Patent No.: US 9,124,143 B2
(45) Date of Patent: Sep. 1, 2015

(54) SYSTEM FOR PROVIDING ELECTRICAL POWER TO A WIND TURBINE COMPONENT

(71) Applicant: ALSTOM RENOVABLES ESPAÑA, S.L., Barcelona (ES)

(72) Inventors: Marc Sala Llumà, Barcelona (ES); Ramon Piñana Àvila, Barcelona (ES)

(73) Assignee: ALSTOM RENEWABLE TECHNOLOGIES, Grenoble (FR)

( * ) Notice: Subject to any disclaimer, the term of this patent is extended or adjusted under 35 U.S.C. 154(b) by 0 days.

(21) Appl. No.: 14/222,990

(22) Filed: Mar. 24, 2014

(65) Prior Publication Data

US 2014/0291990 A1    Oct. 2, 2014

(30) Foreign Application Priority Data

Mar. 27, 2013   (EP) ..................... 13382116

(51) Int. Cl.
*H02J 3/00* (2006.01)
*H02J 11/00* (2006.01)
*F03D 9/00* (2006.01)
*F03D 11/00* (2006.01)

(52) U.S. Cl.
CPC ............. *H02J 11/00* (2013.01); *F03D 9/003* (2013.01); *F03D 9/005* (2013.01); *F03D 11/00* (2013.01); *F05B 2270/107* (2013.01); *Y02E 10/722* (2013.01)

(58) Field of Classification Search
USPC ............................................. 307/84; 290/44
See application file for complete search history.

(56) References Cited

U.S. PATENT DOCUMENTS 3,764,815 A * 10/1973 Habock et al. .................. 290/52
4,256,972 A *  3/1981 Wyatt et al. ..................... 307/68
7,298,055 B2 * 11/2007 Galloway et al. ............... 290/44
(Continued)

FOREIGN PATENT DOCUMENTS

EP    2 236 821       10/2010
JP    2006-009596      1/2006

OTHER PUBLICATIONS

European Search Report for EP 13382116, mailed Sep. 10, 2013, 4 pgs.

*Primary Examiner* — Joseph Waks
(74) *Attorney, Agent, or Firm* — Squire Patton Boggs (US) LLP

(57) ABSTRACT

Systems for providing electrical power to one or more wind turbine electrical components is provided comprising an electrical grid and an auxiliary power source for providing electrical power, and one or more wind turbines. Each of the wind turbines includes a wind turbine generator, one or more electrical components, a main voltage transformer for connecting the wind turbine generator to the grid and a switchgear arranged between the main voltage transformer and a point of connection to the grid. One or more switches for alternately connecting either said electrical grid or said auxiliary power source to the switchgears of the wind turbines are provided. The switchgears comprise a switchgear voltage transformer, the switchgear voltage transformer includes primary and secondary windings, the primary windings receiving power from the electrical grid or auxiliary power source, and the secondary windings delivering electrical power to the wind turbine electrical components.

19 Claims, 3 Drawing Sheets

(56) References Cited

U.S. PATENT DOCUMENTS

| | | | |
|---|---|---|---|
| 7,385,372 B2* | 6/2008 | Ahmad et al. | 318/811 |
| 8,188,610 B2* | 5/2012 | Scholte-Wassink | 290/44 |
| 8,841,796 B2* | 9/2014 | Rosenvard | 307/40 |
| 2009/0134625 A1* | 5/2009 | Altenschulte | 290/44 |
| 2010/0019574 A1* | 1/2010 | Baldassarre et al. | 307/23 |
| 2011/0175355 A1* | 7/2011 | Rosenvard | 290/44 |
| 2012/0242295 A1 | 9/2012 | Bech et al. | |
| 2013/0229056 A1* | 9/2013 | Teichmann, Ralph | 307/18 |
| 2013/0264882 A1* | 10/2013 | Abasolo et al. | 307/80 |

* cited by examiner

PRIOR ART

SYSTEM FOR PROVIDING ELECTRICAL POWER TO A WIND TURBINE COMPONENT

This application claims the benefit of European Patent Application EP 13382116.5 filed on 27 Mar. 2013, the entire contents of which is hereby incorporated by reference for all purposes.

The present disclosure relates to systems and methods for providing electrical power to one or more wind turbine components.

BACKGROUND ART

Wind turbines may be arranged together forming a wind park, with a single point of connection, i.e. the PCC ("Point of Common Coupling"). Wind parks may comprise a substation including e.g. wind park transformers that convert power from the wind park voltage to a grid voltage. Such a substation may further include wind park control systems e.g. a supervisory control and data acquisition system (SCADA).

Wind parks may be arranged on land ("onshore"), or in the water ("offshore"), either as a plurality of floating wind turbines or wind turbines on pillars fixed in the sea bed.

It is known to provide an auxiliary power source, such as e.g. a diesel generator for supplying power to wind turbines when a connection with the grid is lost. Connection with the grid may be lost during planned maintenance, or during installation, but also during normal operation in case of a problem in the grid.

In a wind turbine, electrical components may be categorized into three levels, as follows: Level 1 electrical components are those components which are considered critical. These level 1 components are required to operate continuously, even during stand-by situations, i.e. when a wind turbine is disconnected from the electrical grid, and no electrical power is thus available.

Level 1 components may include components related to communication, and control and manoeuver of the gas insulated switchgear (GIS). It may further include air conditioning systems, sensors, PLCs, beacons and protective systems among others. The power required for these components may e.g. be around 15 kVA.

Level 2 electrical components may include those components which are less critical; these components may be required to operate only occasionally during stand-by situations. Level 2 components may include lubrication pumps, lighting systems, the service lift, pitch and yaw systems among others. The power required for these components may amount to e.g. around 30 kVA.

Finally, level 3 electrical components may not be required to operate during stand-by situations. Level 3 components may include e.g. cooling fans and pumps among others.

So at least for the level 1 components and at least occasionally for the level 2 components, electrical power supply must be available even in case of grid loss.

A plurality of auxiliary power generators, e.g. diesel generators, may be installed at individual wind turbines to be able to supply power to each wind turbine individually. If an auxiliary power generator is provided for each individual wind turbine, a problem is the high cost involved.

Alternatively, at least one more powerful auxiliary power generator may be provided at the central substation supplying all wind turbines simultaneously. If one auxiliary diesel generator is provided for a wind park, the logistics involved in providing fuel to each of the generators can be troublesome, in particular in the case of an offshore wind park.

Having a single more powerful auxiliary diesel generator providing electrical power to all wind turbines in the case of grid loss however may also have other disadvantages. One technical problem may be that the auxiliary diesel generator is over-dimensioned to take into account the in-rush of current at start-up, and the power losses associated with the reactive loads on the one or more transformers within each wind turbine.

One known approach is represented in FIG. 1. Reference sign 100 indicates the electrical grid, and reference sign 200 refers to an auxiliary power generator, for example a diesel generator. A switch 150 may be provided to alternatively connect the wind turbines either to the electrical grid or to the auxiliary power generator.

Each wind turbine may comprise a circuit breaker, which is commonly arranged in a gas insulated switchgear 900 for power ranges relevant to this sort of implementation, and a main wind turbine transformer 300. The main transformer may convert power from 66 kV as delivered from the grid or from the auxiliary power generator to 0.9 kV, the voltage level of the generator 600 of the wind turbine. The rating of the main transformer may be e.g. 6500 kVA.

A secondary wind turbine transformer 400 will further transform the power from 0.9 kV to the voltage level required by the electrical components of the wind turbine, such as e.g. lighting systems, pitch systems, pumps, cooling fans, etc. This voltage level may be 0.4 kV. The rating of the secondary wind turbine transformer may be e.g. 200 kVA in order to be able to feed electrical components of all levels (levels 1, 2 & 3).

The electrical components may be divided into level 1 components 800, which always need power supply and for which an interruption of the operation cannot be accepted and level 2 and 3 components 700, for which interruption of the operation is not necessarily problematic. To this effect, an uninterruptible power supply 500 (UPS) may be added to the level 1 critical electrical components' circuit. Additionally, circuit breakers may be arranged both for the level 1 circuit and for the levels 2 and 3 components. The circuit breaker 250 may be opened in case of grid loss, and only selectively closed so that only power is delivered to those components when needed.

In the event of an interruption of the power supply from the main grid 100, the uninterruptable power supply associated with the level 1 critical electrical components may continue to function for e.g. approximately 30 minutes. However beyond these 30 minutes, the auxiliary power generator will have to deliver the required power via the transformers.

At least one problem related with this kind of arrangement is the major power losses in the main transformer 300.

In examples of the present invention, at least some of the aforementioned problems are at least partially resolved.

SUMMARY

In a first aspect, a system for providing electrical power to one or more wind turbine electrical components is provided comprising an electrical grid and an auxiliary power source for providing electrical power, and one or more wind turbines. Each of the wind turbines includes a wind turbine generator, one or more electrical components, a main voltage transformer for connecting the wind turbine generator to the grid and a switchgear arranged between the main voltage transformer and a point of connection to the grid. One or more switches for alternately connecting either said electrical grid or said auxiliary power source to the switchgears of the wind turbines are provided. The switchgears comprise a switchgear voltage transformer, the switchgear voltage transformer includes primary and secondary windings, the primary windings receiving power from the electrical grid or auxiliary power source, and the secondary windings delivering electrical power to the wind turbine electrical components while bypassing the main voltage transformer.

A switchgear may be regarded as the combination of electrical disconnect switches, fuses or circuit breakers used to control, protect and isolate electrical equipment. A switchgear may generally include a voltmeter measuring the voltage in secondary windings of a voltage transformer. The voltmeter may be used to detect electrical power supply from the grid, i.e. as long as a voltage is present, electrical power is supplied by the grid. In alternative arrangements, a voltmeter or any other device suitable for detecting the presence of power supply in the electrical grid.

In accordance with this first aspect, a voltage transformer of the switchgear which ordinarily is only used for lowering the high line voltage e.g. approximately 66 kV down to e.g. approximately 120-400V, for measuring voltage and for detecting whether there is power supply from the grid or not is additionally used to supply power to one or more wind turbine components. By using this transformer, the main transformer may be bypassed and so the losses may be reduced. This may reduce the use of (diesel) fuel of an auxiliary power generator.

In some examples, the wind turbine electrical components may be divided according to at least two different levels, wherein a first level is defined for electrical components requiring permanent operation. In these examples, optionally a second level is defined for electrical components requiring occasional operation during stand-by situations and a third level is defined for electrical components not required during stand-by situations.

In some examples, a switch for alternately connecting the first level wind turbine electrical components to the switchgear voltage transformer secondary windings or the main transformer may be provided. In case of grid connection the level 1 components may receive electrical power in a conventional manner, i.e. through the main transformer and possibly a secondary transformer. In case of grid loss, the switch may ensure that electrical power is delivered through the transformer of the switchgear.

In alternative examples, instead of switches or in addition to switches, circuit breakers may be used to establish the same effect. In some examples, one or more circuit breakers for disconnecting the second level and/or third level wind turbines electrical components may be provided.

Optionally, a switch for alternately connecting the second level wind turbine electrical components to the switchgear voltage transformer secondary windings or to the main transformer may be also provided.

The auxiliary power source used may be a liquid fuel generator, optionally a diesel generator. However, in other examples, any other auxiliary power source may be used, including a renewable energy source. For instance, an offshore wind turbine may have solar power or wave power system for the collection, storage and supply of the minimum power required for the operation of first level electrical components, and occasionally, second level electrical components.

In another aspect, a method for providing electrical power to one or more wind turbine components when no power is supplied by a power grid is provided for systems substantially as hereinbefore described. The method comprises detecting a drop in power supply from the grid, switching the power supply to the switchgear from electrical grid to the auxiliary power source, connecting the first level electrical components to the secondary windings of the switchgear transformer, and operating the auxiliary power source.

In this aspect, a method of operating e.g. a wind park is provided in which electrical power supply may be ensured in an efficient manner, even when no power is delivered from the electrical grid.

In some examples, when no power is supplied by the power grid, the method may further comprise selectively connecting one or more electrical components other than first level electrical components to the secondary windings of the switchgear transformer. By selectively connecting one or more electrical components of e.g. second level electrical components or e.g. one wind turbine at a time, the power that needs to be supplied through the switchgear may be kept to a minimum.

Additional objects, advantages and features of examples of the present invention will become apparent to those skilled in the art upon examination of the description, or may be learned by practice of the invention.

BRIEF DESCRIPTION OF THE DRAWINGS

Particular embodiments of the present invention will be described in the following by way of non-limiting examples, with reference to the appended drawings, in which.

DETAILED DESCRIPTION

Figure 1:
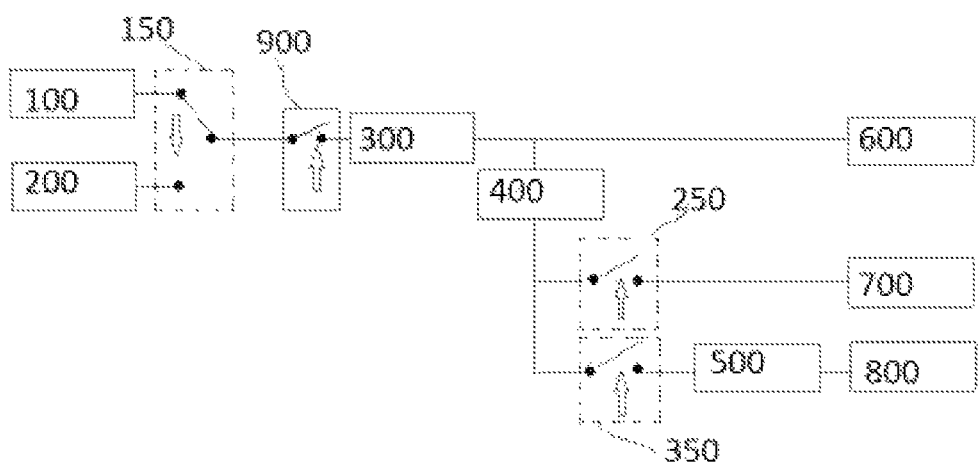
FIG. 1 schematically illustrates a prior art solution.
Figure 2:
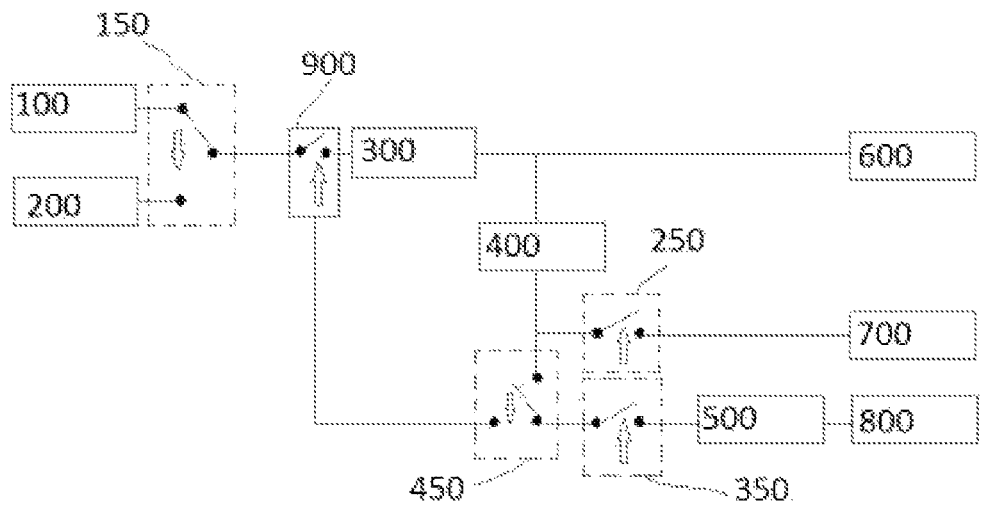
FIG. 2 schematically illustrates a first example of a system providing electrical power to one or more wind turbine components.

FIG. 2 schematically illustrates an example of a system for supplying power to one or more electrical components of a wind turbine.

The reference sign 100 refers to the electrical grid, or e.g. to a transformer of a substation connecting an offshore wind park to a high voltage transmission line (either High Voltage DC or High Voltage AC).

An auxiliary power source, such as e.g. a diesel generator 200 may be provided at the substation as well. Any form of auxiliary power source could be used, but diesel generators are the most common. In some examples, a single auxiliary power source may be sufficient to supply power to all wind turbines during standby situations. The single auxiliary power source may be arranged at an offshore substation in case of an offshore wind park. In another example, a plurality of auxiliary power sources may be arranged at the substation.

A switch 150 may alternatively connect a wind turbine to either the electrical power from the grid or the auxiliary power source. Reference sign 300 refers to the wind turbine main transformer (as before) that transforms power to the voltage level of the wind turbine generator 600.

As before, a secondary transformer 400 may further transform the voltage to a suitable level for various electrical components of a wind turbine, e.g. 0.4 kV.

A switchgear, optionally a gas insulated switchgear 900 is arranged "upstream" from the main transformer and may generally serve to control, protect and isolate electrical equipment. A transformer which ordinarily is used only in connection with a voltmeter, may be used to supply electrical power to electrical components of a wind turbine. Depending on which electrical components are involved, and depending on the electrical power required at any moment, it may be necessary to "upgrade" a standard switchgear transformer to be able to deliver sufficient power.

In this example, electrical components of the wind turbine may be divided into level 1 components 800 and level 2&3 components 700. The level 1 components' operation may never be interrupted, and to this end a standard Uninterruptable Power Supply (UPS) 500 may be foreseen. In case of grid loss, it will generally not be possible to have electrical power immediately delivered from the auxiliary power source. For example, a diesel generator needs to be started up and warmed up before being able to deliver full power. The UPS 500 may be able to deliver electrical power for e.g. up to approximately 30 minutes or more. By then, the electrical power supply from the auxiliary power source should be established.

In this example, a switch 450 may alternatively connect the level 1 electrical components 800 to the transformer of the switchgear 900 or to the main and secondary transformers 300 and 400. A first circuit breaker "upstream" from the UPS may be arranged for isolating the level 1 components. Similarly, a second circuit breaker may isolate, and disconnect level 2 and level 3 components.

In accordance with this arrangement, when electrical power is available from the grid, all electrical components may be connected to the grid through the main transformer 300. When power is not available from the grid, power may be supplied to the level 1 components through the switchgear or the UPS.

A control signal indicating a switch from grid supply to auxiliary power supply may be generated at the level of a supervisory control and data acquisition system (SCADA) of a wind park and may be sent to all individual wind turbines.

Figure 3:
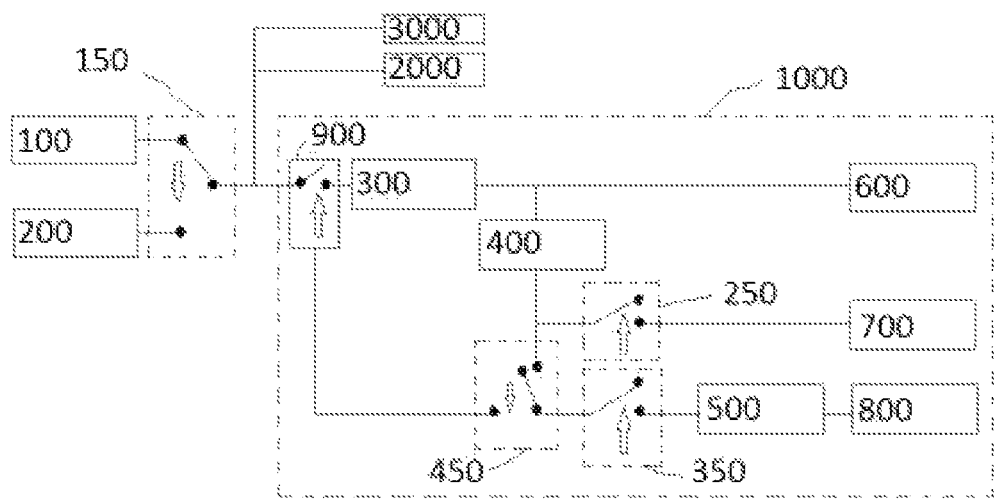
FIG. 3 schematically illustrates an example of a system providing electrical power to one or more wind turbine components in a wind park.

FIG. 3 schematically illustrates a similar example. In this illustrated example, a wind park comprising at least three wind turbines 1000, 2000 and 3000 are shown. Each wind turbine 1000, 2000, 3000 comprises similar components, i.e. each wind turbine includes a switchgear with a voltage transformer for supplying power to the wind turbines' electrical components. However, they are only illustrated for one of them, namely wind turbine 1000.

Figure 4:
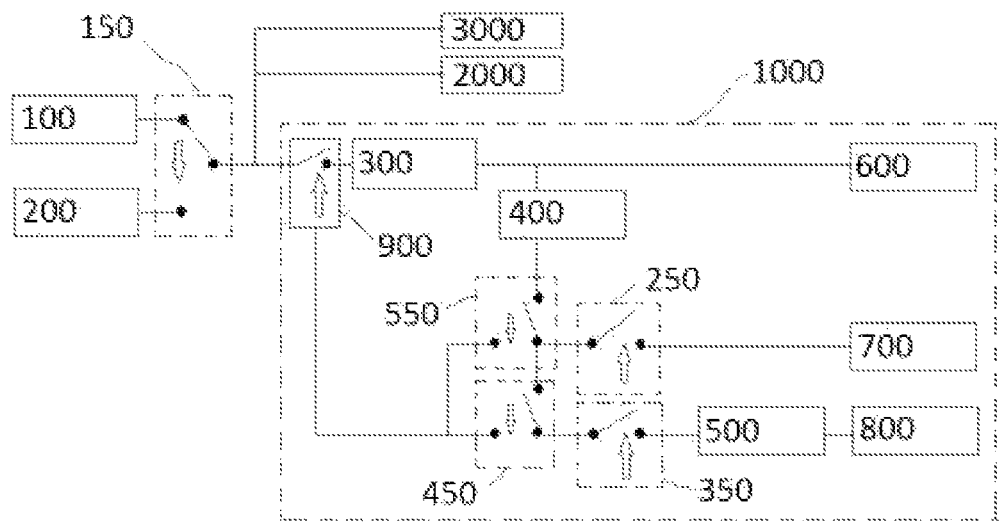
FIG. 4 schematically illustrates another example of a system providing electrical power to one or more wind turbine components in a wind park.

FIG. 4 schematically illustrates a slightly different arrangement. The same reference signs used in FIGS. 2 and 3 may denote the same or similar components. As in the previous examples, switchgear 900 may be used to supply power to various electrical components.

A slightly different arrangement of switches and circuit breakers is provided in this example. A first level switch 450 (as in the examples of FIGS. 2 and 3) may alternatively connect the level 1 electrical components 800 to the transformer of the switchgear 900 or to the main and secondary transformers 300 and 400. A second level switch 550 may alternatively connect the level 2 (and level 3) components to the transformer of the switchgear 900 or to the main and secondary transformers 300 and 400. As in the previous example, first and second circuit breakers 350 and 250 may be provided.

In this example, selectively one or more level 2 components may also receive power from the switchgear. In order to keep the rating of the transformer of the switchgear to a reasonable limit, it is preferable that only very selectively level 2 components request electrical power. For example, only some level 2 components of wind turbine 1000 are provided with power in a first instance. In a second instance, only some level 2 components of wind turbine 2000 are provided with power. At that point in time, the level 2 components of wind turbines 1000, 3000 and others may be disconnected.

It will be clear that further alternative arrangements of circuit breakers and switches may be used to selectively supply power to the different electrical components from either one source (the grid) or the other (the auxiliary power source).

Figure 5:
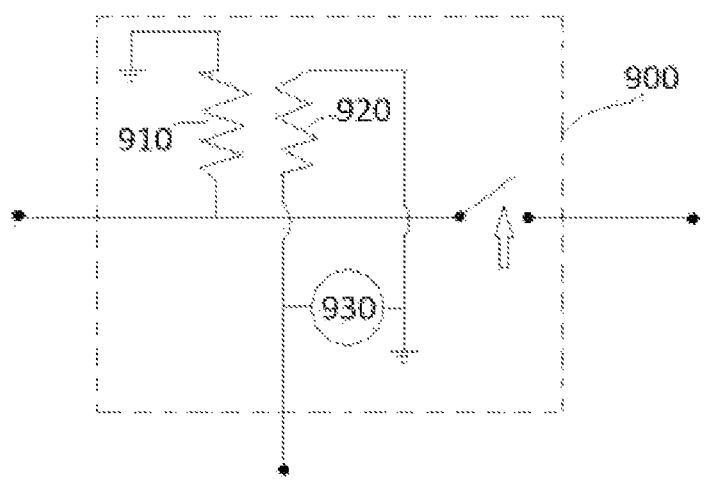
FIG. 5 schematically illustrates a voltage transformer of a switchgear.

FIG. 5 schematically illustrates a part of a switchgear 900 that may be used in the different disclosed examples. Switchgear 900 may comprise a transformer having primary windings (or primary sets of windings) 910 and secondary windings (or secondary sets of windings) 920. A voltmeter 930 may measure the voltage of the secondary windings. In case of grid loss, no voltage will be detected.

In the disclosed examples, the same voltage transformer that is normally used for voltage metering may be used to supply power to components of one or more wind turbines.

In alternative examples, the voltmeter (or any other device suitable for detecting the presence of power supply in the grid) does not necessarily need to be integrated in the switchgear. For example, a voltmeter may be arranged outside the switchgear. Alternatively, a portable voltmeter could also be used.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

The invention claimed is:

1. A system for providing electrical power to one or more wind turbine electrical components, comprising:
   an electrical grid for providing electrical power;
   an auxiliary power source for providing electrical power;
   one or more wind turbines, each of the wind turbines including
      a wind turbine generator, one or more electrical components, a main voltage transformer for connecting the wind turbine generator to the grid and a switchgear arranged between the main voltage transformer and a point of connection to the grid; and
   one or more switches for alternately connecting either the electrical grid or the auxiliary power source to the switchgears of the wind turbines;
   wherein the switchgears comprise a switchgear voltage transformer, the switchgear voltage transformer including primary and secondary windings, the primary windings receiving power from the electrical grid or auxiliary power source, and the secondary windings delivering electrical power to the wind turbine electrical components while bypassing the main voltage transformer.

2. The system according to claim 1, wherein the wind turbine electrical components are divided into at least two different levels,
   wherein a first level is defined for electrical components requiring permanent operation.

3. The system according to claim 2, wherein
   a second level is defined for electrical components requiring occasional operation during stand-by situations; and
   a third level is defined for electrical components not required during stand-by situations.

4. The system according to claim 3, further comprising one or more circuit breakers for disconnecting the second level and/or third level wind turbine electrical components.

5. The system according to claim 3, further comprising a switch for alternately connecting the second level wind turbine electrical components to the switchgear voltage transformer secondary windings or to the main transformer.

6. The system according to claim 3, comprising an uninterruptible power supply between the switchgear and the first level wind turbine electrical components.

7. The system according to claim 2, further comprising a switch for alternately connecting the first level wind turbine electrical components to the switchgear voltage transformer secondary windings or the main transformer.

8. The system according to claim 2, comprising an uninterruptable power supply between the switchgear and the first level wind turbine electrical components.

9. The system according to claim 1, wherein the switchgear comprises a voltmeter.

10. The system according to claim 1, wherein the auxiliary power source is a liquid fuel generator.

11. The system according to claim 10, wherein the liquid fuel generator is a diesel generator.

12. The system according to claim 1, wherein the switchgears are gas insulated switchgears.

13. The system according to claim 1, wherein the system comprises a wind farm having a plurality of wind turbines.

14. The system according to claim 13, further comprising a substation and wherein the auxiliary power source is arranged at the substation.

15. The system according to claim 14, wherein the wind farm is an offshore wind farm.

16. A method for providing electrical power to one or more wind turbine components when no power is supplied by a power grid in a system according to claim 2, the method comprising:

detecting a drop in power supply from the grid, operating the auxiliary power source, switching the power supplied to the switchgear from the electrical grid to the auxiliary power source, and connecting the first level electrical components to the secondary windings of the switchgear transformer.

17. The method according to claim 16, further comprising when power is detected at the electrical grid, connecting the first level electrical components to the wind turbine main transformer, and switching the power supply from the auxiliary power source to the electrical grid.

18. The method according to claim 16, further comprising, when no power is supplied by the power grid, selectively connecting one or more electrical components other than the first level electrical components to the secondary windings of the switchgear transformer.

19. The method according to claim 16, wherein detecting the drop in power supply comprises detecting a drop in power supply by a voltmeter located within the switchgear.

* * * * *